United States Patent [19]

Martinez

[11] 4,137,521

[45] Jan. 30, 1979

[54] ANTENNA ALARM

[76] Inventor: Roberto Martinez, 2408 Whitewing, McAllen, Tex. 78501

[21] Appl. No.: 766,886

[22] Filed: Feb. 9, 1977

[51] Int. Cl.$^2$ .................. G08B 13/14; B60R 25/10
[52] U.S. Cl. ................................... 340/63; 340/568;
340/653; 307/10 AT; 200/51.1; 340/687;
343/894
[58] Field of Search ............... 340/63, 64, 275, 280;
307/10 AT; 200/42 R, 51.1; 180/114

[56] References Cited

U.S. PATENT DOCUMENTS 1,667,650   4/1928   Bradley et al. ............... 340/63 UX 3,453,591   7/1969   Perez ............................. 340/64
4,047,167   9/1977   Helena .......................... 340/280

*Primary Examiner*—Alvin H. Waring
*Attorney, Agent, or Firm*—Gary C. Honeycutt

[57] ABSTRACT

A system is provided for automatically actuating an alarm whenever a would-be thief attempts to remove the antenna from a vehicle equipped with a C.B. radio or other communication system. The preferred embodiment includes a hidden switch which remains depressed by the antenna until it is partially unscrewed, at which time the switch closes the alarm circuit. For example, the horn of the vehicle may be connected to the switch and serve as the alarm.

2 Claims, 3 Drawing Figures

ANTENNA ALARM

This invention relates to an alarm system for an antenna, and more particularly to an antenna mounting assembly which includes means for actuating an alarm whenever the antenna is removed, or partially removed.

Because of the numerous antenna thefts that are reported daily, there is an obvious need for devices that will prevent or at least discourage such thefts. In accordance with the present invention means are provided to automatically sound an alarm whenever an antenna is removed or partially removed. The system is primarily intended for use in connection with a mobile vehicular radio antenna, such as the popular C.B. radio found in many automobiles, trucks, vans, etc. A convenient alarm signal generator in such vehicular units is the horn of the vehicle itself.

For example, the typical screw-threaded antenna base member is equipped with a switch closely spaced therefrom, such that the antenna will engage the switch whenever the antenna is fully screwed in place on the base. The antenna also hides the switch from view so that a thief cannot see anything to make him suspect that there is an alarm or anything unusual about the antenna or its mounting assembly.

Upon attempting to steal the antenna by unscrewing it from the base, the thief will release the switch, thereby closing a circuit connected to the horn, a siren, or other alarm signal, so that the thief will be startled and run away without fully removing the antenna. Police or other persons may be attracted by the alarm and apprehend the thief, or at least assist in his identification.

Figure 1:
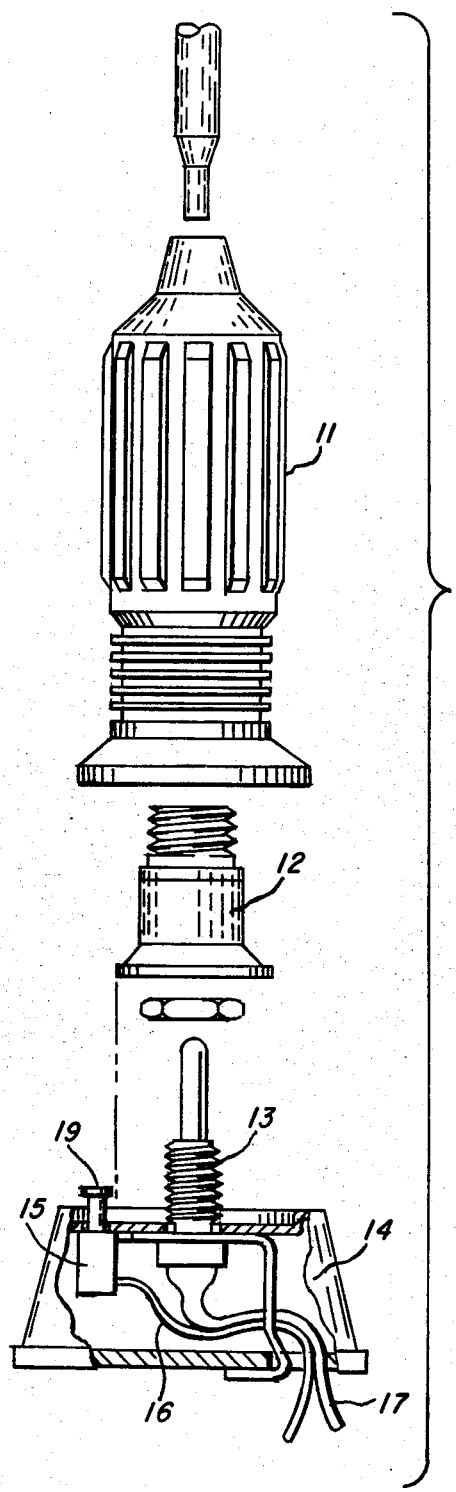
FIG. 1 is a partially disassembled perspective view of the system of the invention.

In FIG. 1, loading coil 11 is shown just above screw-threaded base member 12 which fits in place upon stud 13 and base plate 14. Switch 15, mounted on plate 14, is shown in its closed position, which actuates a siren connected to cable 16. Cable 17 is the antenna lead, connected to the radio.

Figure 2:
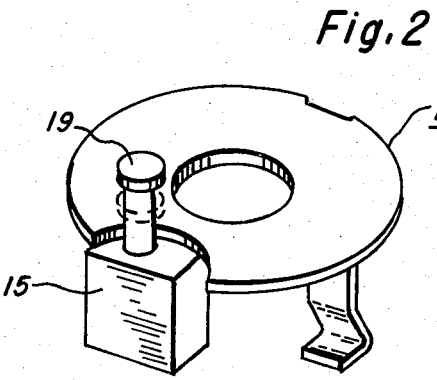
FIG. 2 is a top view of the mounting bracket, showing how to locate the switch of the system.

In FIG. 2, it can be seen that the location of switch 15 may require removal of a portion of bracket 18 so that the bottom portion of the loading coil will be permitted to engage switch 15 when fully screwed in place on base 12. Such engagement of the switch depresses button 19 of the switch and opens the alarm circuit.

Figure 3:
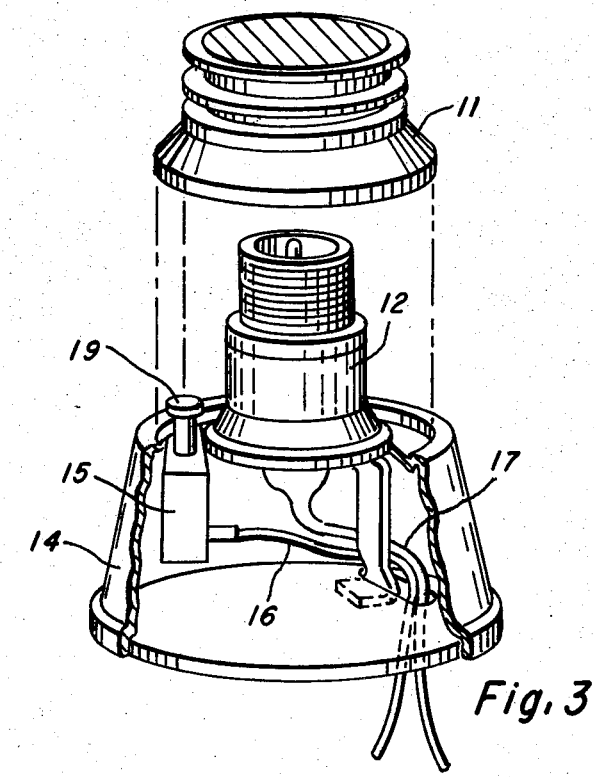
FIG. 3 is a perspective view of the system, showing the assembled position of the switch relative to the base member that receives the antenna.

FIG. 3 shows the base member 12 fully screwed in place, and the adjacent position of switch 15. When loading coil 11 is fully screwed in place, its bottom portion will depress button 19 and thereby keep the alarm circuit open.

What is claimed is:

1. An antenna and support assembly, comprising;
   (a) an antenna; said antenna including a loading coil;
   (b) a screw-threaded base member adapted to receive said loading coil;
   (c) a screw-threaded stud member in combination with a base plate, said stud member being adapted to receive said base member;
   (d) a push-button switch mounted in combination with said base plate, the button thereof being located in an upright position at a distance from said stud sufficient to clear the lower edge of said base member when the latter is screwed in place, but at least partly within the radius of the bottom of the loading coil, whereby said button is depressed by the bottom of the loading coil when the latter is screwed in place; and
   (e) a remote alarm signal generating means electrically coupled to said switch, whereby removal of said antenna turns on the alarm signal.

2. A system as in claim 1 wherein the antenna is for a mobile radio unit and the alarm signal generating means is the horn of the vehicle wherein the radio is located.

* * * * *